US012615285B2

(12) United States Patent
Kumar et al.

(10) Patent No.: US 12,615,285 B2
(45) Date of Patent: Apr. 28, 2026

(54) SYSTEM AND METHOD FOR PERFORMING ROOT-CAUSE ANALYSIS OF ANOMALIES IN A SHARED DATA PROTECTION ENVIRONMENT

(71) Applicant: Druva Inc., Santa Clara, CA (US)

(72) Inventors: Prabal Kumar, Pune (IN); Preethi Srinivasan, Sunnyvale, CA (US); Vinay Punera, Pune (IN)

(73) Assignee: DRUVA INC., Santa Clara, CA (US)

( * ) Notice: Subject to any disclaimer, the term of this patent is extended or adjusted under 35 U.S.C. 154(b) by 88 days.

(21) Appl. No.: 18/635,485

(22) Filed: Apr. 15, 2024

(65) Prior Publication Data

US 2024/0348642 A1    Oct. 17, 2024

(30) Foreign Application Priority Data

Apr. 15, 2023    (IN) .............................. 202341027803

(51) Int. Cl.
*H04L 9/40*        (2022.01)
*G06F 11/1446*     (2026.01)

(52) U.S. Cl.
CPC ...... *H04L 63/1441* (2013.01); *G06F 11/1464* (2013.01); *G06F 11/1469* (2013.01); *H04L 63/1425* (2013.01); *G06F 2201/84* (2013.01)

(58) Field of Classification Search
None
See application file for complete search history.

(56)                References Cited

U.S. PATENT DOCUMENTS

| | | | |
|---|---|---|---|
| 11,381,583 B1 * | 7/2022 | Ellis .................... | H04L 63/1425 |
| 12,267,350 B2 * | 4/2025 | Singh ................. | H04L 63/0236 |
| 2022/0398150 A1 * | 12/2022 | Chopra .............. | G06F 11/0751 |
| 2023/0027733 A1 * | 1/2023 | Singh .................... | G06F 21/554 |
| 2023/0421601 A1 * | 12/2023 | Bolger ................... | H04L 63/08 |

* cited by examiner

*Primary Examiner* — Jeffrey R Swearingen

(74) *Attorney, Agent, or Firm* — Vorys, Sater, Seymour and Pease, LLP

(57)            ABSTRACT

A system for performing root-cause analysis of cost and/or usage anomalies in a shared data protection environment is presented. The shared backup environment includes a backup/restore system configured to backup data in a storage server and/or restore data from the storage server. The system is configured to perform the root-cause analysis based on storage server data and backup/restore system telemetry data.

18 Claims, 4 Drawing Sheets

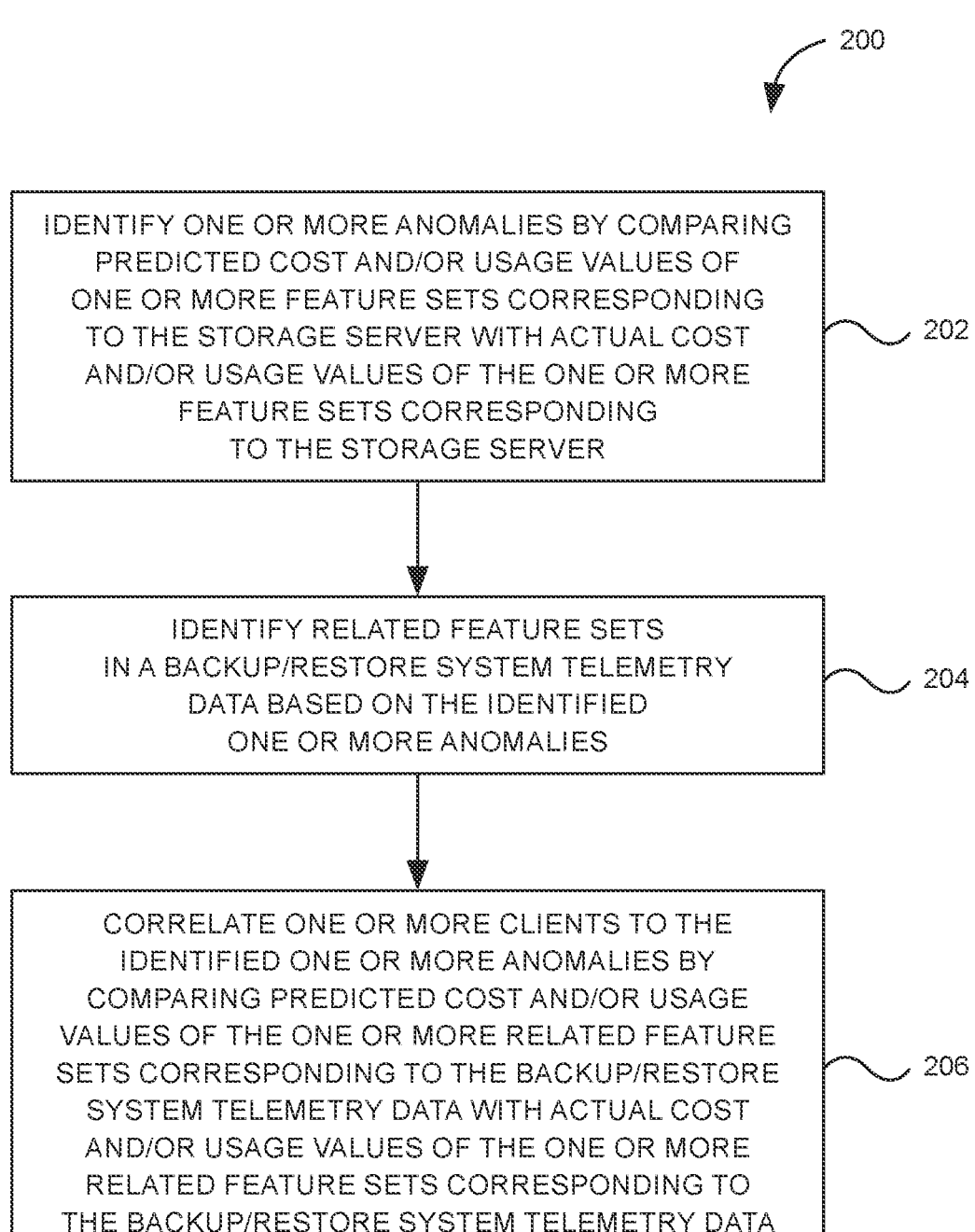

200

IDENTIFY ONE OR MORE ANOMALIES BY COMPARING
PREDICTED COST AND/OR USAGE VALUES OF
ONE OR MORE FEATURE SETS CORRESPONDING
TO THE STORAGE SERVER WITH ACTUAL COST
AND/OR USAGE VALUES OF THE ONE OR MORE
FEATURE SETS CORRESPONDING
TO THE STORAGE SERVER

202

IDENTIFY RELATED FEATURE SETS
IN A BACKUP/RESTORE SYSTEM TELEMETRY
DATA BASED ON THE IDENTIFIED
ONE OR MORE ANOMALIES

204

CORRELATE ONE OR MORE CLIENTS TO THE
IDENTIFIED ONE OR MORE ANOMALIES BY
COMPARING PREDICTED COST AND/OR USAGE
VALUES OF THE ONE OR MORE RELATED FEATURE
SETS CORRESPONDING TO THE BACKUP/RESTORE
SYSTEM TELEMETRY DATA WITH ACTUAL COST
AND/OR USAGE VALUES OF THE ONE OR MORE
RELATED FEATURE SETS CORRESPONDING TO
THE BACKUP/RESTORE SYSTEM TELEMETRY DATA

SYSTEM AND METHOD FOR PERFORMING ROOT-CAUSE ANALYSIS OF ANOMALIES IN A SHARED DATA PROTECTION ENVIRONMENT

PRIORITY STATEMENT

The present application claims priority under 35 U.S.C. § 119 to Indian patent application number 202341027803 filed 15 Apr. 2023 the entire contents of which are hereby incorporated herein by reference.

BACKGROUND

Embodiments of the present invention generally relate to systems and methods to perform root-cause analysis of anomalies in a shared data protection environment, and more particularly to systems and methods to perform root-cause analysis of cost and/or usage anomalies in a shared data protection environment.

Enterprises these days seek reliable, cost-effective ways to protect the data stored on their computer networks while minimizing the impact on productivity. An enterprise might back up critical computing systems such as databases, file servers, web servers, virtual machines, and so on as part of a daily, weekly, or monthly maintenance schedule. In the event of data loss, data corruption, and/or other disaster-related occurrences, the backed-up data may be restored to the primary data source or another restore destination.

The data is typically backed up in a shared data protection environment, for example, a cloud-based storage server. In such shared data protection environments, sometimes there are unexplained spikes/anomalies in cloud CoGs (Cost of Goods Sold) due to complex data pipelines. The root cause of these spikes/anomalies may be due to various factors such as cloud services, instances, API activities, product events such as compaction, etc., and customer-triggered activity such as an increase in backup frequency, restore, etc. However, it is difficult to correlate the spikes/anomalies to a corresponding trigger due to a lack of readily available data analytics. Thus, there is a need for an efficient way to correlate and provide root-cause analysis of such spikes/anomalies.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for performing root-cause analysis of cost and/or usage anomalies in a shared data protection environment is presented. The shared backup environment includes backup/restore system configured to backup data in a storage server and/or restore data from the storage server. The system includes a memory configured to store one or more processor-executable routines, and a processor communicatively coupled to the memory. The processor is configured to execute the one or more processor-executable routines to identify one or more anomalies by comparing predicted cost and/or usage values of one or more feature sets corresponding to the storage server with actual cost and/or usage values of the one or more feature sets corresponding to the storage server; identify one or more related feature sets in a backup/ restore system telemetry data based on the identified one or more anomalies; and correlate one or more clients to the identified one or more anomalies by comparing predicted cost and/or usage values of the one or more related feature sets corresponding to the backup/restore system telemetry data with actual cost and/or usage values of the one or more related feature sets corresponding to the backup/restore system telemetry data.

According to another example embodiment, a method for performing root-cause analysis of cost and/or usage anomalies in a shared data protection environment is presented. The shared data protection environment includes a backup/restore system configured to backup data in a storage server and/or restore data from the storage server. The method includes identifying one or more anomalies by comparing predicted cost and/or usage values of one or more feature sets corresponding to the storage server with actual cost and/or usage values of the one or more feature sets corresponding to the storage server; identifying related feature sets in a backup/restore system telemetry data based on the identified one or more anomalies; and correlating one or more clients to the identified one or more anomalies by comparing predicted cost and/or usage values of the one or more related feature sets corresponding to the backup/restore system telemetry data with actual cost and/or usage values of the one or more related feature sets corresponding to the backup/restore system telemetry data.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 2 is a block diagram illustrating an example root-cause analysis system, according to some aspects of the present description.

DETAILED DESCRIPTION OF EXAMPLE EMBODIMENTS

Figure 1:
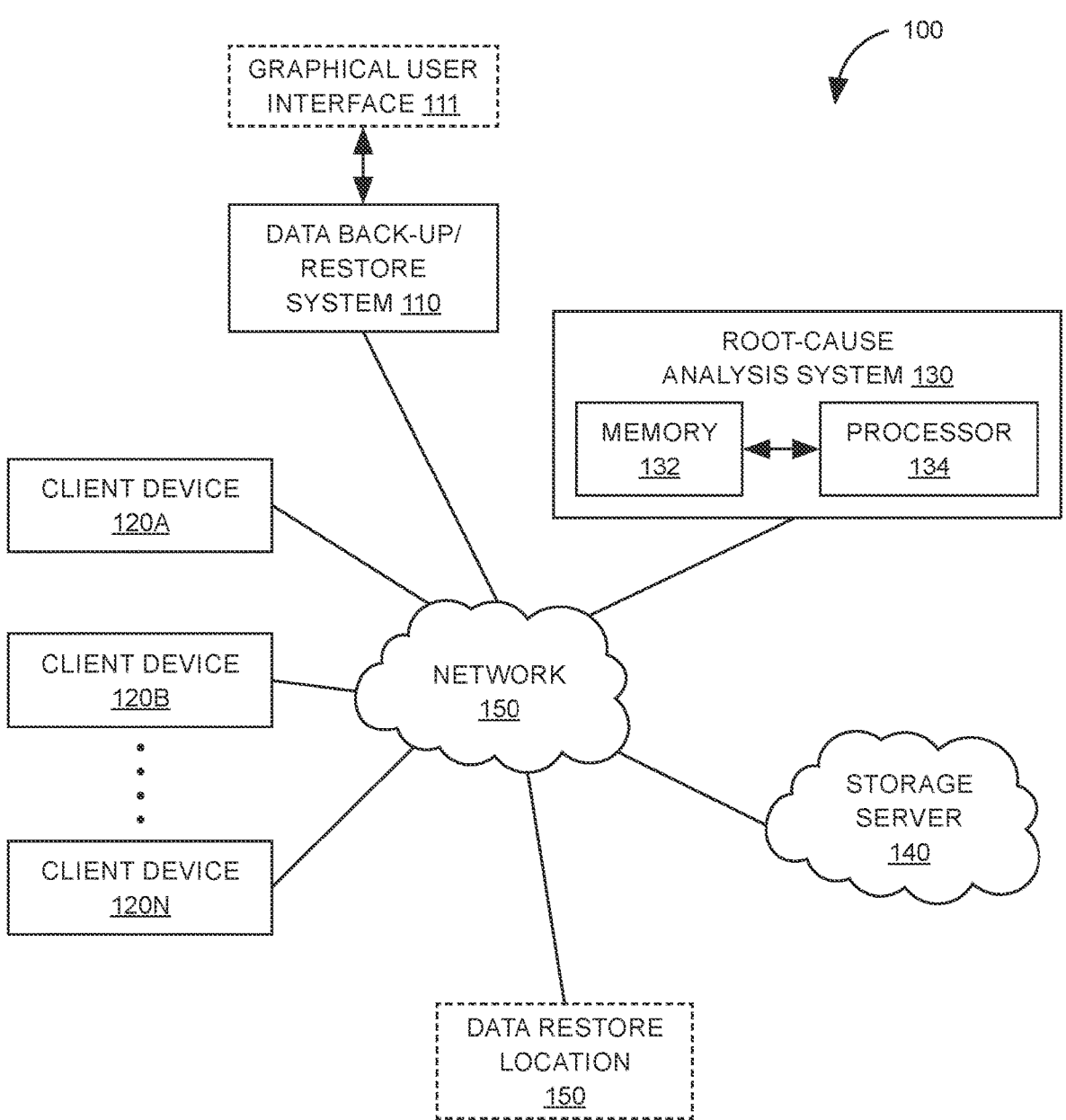
FIG. 1 is a block diagram illustrating an example data protection environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present invention provide systems and methods for performing root-cause analysis of anomalies in a shared data protection environment, and more particularly systems and methods for performing root-cause analysis of cost and/or usage anomalies in a shared data protection environment.

FIG. 1 illustrates an example data protection environment 100, in accordance with some embodiments of the present invention. The data protection environment 100 includes a backup/restore system 110, one or more client devices 120 (120A, 120B . . . 120N), a root cause analysis system 130, a storage server 140, and optionally a restore location 150 (during a data restore scenario). The data protection system environment 100 may be configured to back up data from the one or more client devices 120 in the storage server 140 using the backup/restore system 110. Alternately, the data backup/restore protection environment 110 may be configured to restore data from the storage server 140 to the restore location 150 using the backup/restore system 110. Examples of data to be backed up/restored include, but are not limited to, a text file, an image file, an audio clip, a video clip, an email, a data file, or any combination thereof.

The backup/restore system 110 may be a software or a hardware component that enables the one or more client devices 120 to back up and/or restore data, and optionally search and access the backup data. In some embodiments, the backup/restore system 110 is a cloud-based service. The backup/restore system 110 may optionally further provide a graphical user interface 111 for individual clients to control the data backup/restore process. For example, a graphical user interface 111 may be a front-end cloud storage interface. Additionally, the backup/restore system 110 may provide APIs for the access and management of files from the storage server 140.

The one or more client devices 120 (referred to herein as "device") may be any computing devices that have data that may need backup. Examples of such devices 120 include without limitation, workstations, personal computers, desktop computers, or other types of generally fixed computing systems such as mainframe computers, servers, and minicomputers. Other examples of such devices 120 include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

As noted earlier, the data protection environment 100 is a shared data protection environment that includes a plurality of devices 120. The plurality of devices 120 may be from a single client or from different clients being serviced by the backup/restore system 110 such as shown in FIG. 1. In some embodiments, the data protection environment 100 includes a plurality of devices 120 corresponding to different clients being serviced by the backup/restore system 110.

In some embodiments, the storage server 140 is a cloud-based storage. The data sets from the one or more devices 120 may be stored and backed up in an object-based storage, a file-based storage, or a block-based storage. Non-limiting examples of the suitable storage server 140 include AMA-ZON S3, RACKSPACE CLOUD FILES, AZURE BLOB STORAGE, and GOOGLE CLOUD STORAGE.

The restore location 150 may be packaged/configured with the client device 120 (e.g., an internal hard disk) and/or may be external and accessible by the client device 120 (e.g., network-attached storage, a storage array, etc.). Non-limiting examples of the restore location 150 may include, without limitation, disk drives, storage arrays (e.g., storage-area network (SAN) and/or network-attached storage (NAS) technology), semiconductor memory (e.g., solid-state storage devices), network-attached storage (NAS) devices, tape libraries, or other magnetic, non-tape storage devices, optical media storage devices, or combinations thereof. In some embodiments, the restore location 150 is provided in a cloud storage environment (e.g., a private cloud or one operated by a third-party vendor). In embodiments where the restore location 150 is a storage system internal to the client device 120, the block representing the restore location 150 may be present in the client device 120 itself.

The various components in the backup/restore system environment 100 may communicate through the network 160 and/or locally. It should be noted that although a single block 160 is shown to represent a network in FIG. 1, the system environment 100 may include a plurality of networks 160 to connect different components of the system environment 100. For example, in some embodiments, one of the system components may communicate locally with the backup/restore system 110, while other components communicate with the backup/restore system 110 through the networks. In other embodiments, every component in the backup/restore system environment 100 is online and communicates with each other through the network 160. In one embodiment, the network 160 uses standard communications technologies and/or protocols. Thus, the network 160 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the backup/restore system 110, the root-cause analysis system 130, the storage server 140, and the restore location 150 are each represented by a single block in FIG. 1, each of these components may include multiple distributed and/or independent computers (may also be referred to as workers) working cooperatively and in parallel with other computers so that the operation of the entire system will not be affected when one or more workers are down. Moreover, although, the one or more client devices, the backup/restore system 110, the root-cause analysis system 130, and the restore location 150 are each represented by a separate block, one or more of these systems may be co-located. For example, in some embodiments, the restore location may be present within one or more of the client devices and/or the root-cause analysis system 130 may be a component of the backup/restore system 110.

As mentioned earlier, the root-cause analysis system 130 is configured to perform root-cause analysis of cost and/or usage anomalies in the shared data protection environment 100, wherein the shared data protection environment 100 includes the backup/restore system 110 configured to backup data in the storage server 140 and/or restore data from the storage server 140. In some embodiments, the root-cause analysis system 130 is configured to perform root-cause analysis for one or more cost anomaly use cases in the shared data protection environment. In some other embodiments, the root-cause analysis system 130 is configured to perform root-cause analysis for one or more data protection and ransomware detection use cases in the shared data protection environment.

The root-cause analysis system 130 in accordance with the present invention is configured to perform the root-cause analysis based on the storage server data and the backup/restore system telemetry data. Storage server data may include, for example, storage usage and/or cost data. As noted earlier, the storage server 140 may include a cloud-based storage, and in such embodiments, the storage system data may include cloud usage and/or cost data.

The storage server data and the backup/restore system telemetry data may be further characterized by one or more feature sets. The term "feature set" as used herein refers to a combination of attributes in a dataset and helps in pointing to a specific API usage and/or backup/restore system feature. Non-limiting examples of attributes in a feature set corresponding to the storage server dataset include cloud account id, region, service name, API operation, and the like. Similarly, non-limiting examples of attributes in a feature set corresponding to backup/restore system telemetry data include customer id, region, backup/restore system feature, cloud service API operation, and the like.

Referring again to FIG. 1, the root-cause analysis system 130 further includes a memory 132 and a processor 134 communicatively coupled to the memory. The memory 132 is configured to store one or more processor-executable routines.

The processor 134 is configured to execute the one or more processor-executable routines to identify one or more anomalies by comparing predicted cost and/or usage values of one or more feature sets corresponding to the storage server 140 with actual cost and/or usage values of the one or more feature sets corresponding to the storage server 140.

In some embodiments, the processor 134 is further configured to execute the one or more processor-executable routines to access historical data including cost and/or usage data corresponding to the storage server 140. The historical data may be collected for any time duration suitable for forecasting the storage server data. The processor 134 is further configured to execute the one or more processor-executable routines to identify one or more feature sets from the historical data corresponding to the storage server 140. As noted earlier, the one or more feature sets may include a set of attributes corresponding to the storage server 140, such as, for example, cloud account id, region, service name, API operation, and the like.

The processor 134 is furthermore configured to execute the one or more processor-executable routines to estimate predicted cost and/or usage values for each feature set of one or more feature sets corresponding to the storage server 140. In some embodiments, the processor 134 is configured to execute the one or more processor-executable routines to estimate the predicted cost and/or usage values for each feature set of one or more feature sets corresponding to the storage server based on one or more trained time-series forecasting models. Non-limiting examples of time-series forecasting models include Fbprophet, ARIMA, SARIMA, exponential smoothing, and the like. The predicted cost and/or usage values may be stored in the memory 132 in some embodiments, and the processor 134 may be configured to access the predicted cost and/or usage values from the memory 132.

The processor 134 is further configured to execute the one or more processor-executable routines to access the actual cost and/or usage values of the one or more feature sets corresponding to the storage server 140. In some embodiments, the processor 134 is configured to access the actual cost and/or usage values in real-time. In some other embodiments, the processor 134 is configured to access the actual cost and/or usage values at defined time intervals. In some embodiments, the processor 134 is configured to access the actual cost and/or usage values of each attribute of the one or more feature sets.

As noted earlier, the processor 134 is further configured to compare the actual cost and/or usage values of the one or more feature sets corresponding to the storage server 140 with the predicted cost and/or usage values of the same one or more feature sets corresponding to the storage server 140. In some embodiments, the processor is configured to execute the one or more processor-executable routines to identify one or more anomalies if the actual cost and/or usage values vary from the predicted cost and/or usage values based on a defined variance limit. For example, if the difference between the actual cost and/or usage values is within the defined variance limit then no anomalies are identified. However, if the difference between the actual cost and/or usage values is outside the defined variance limit then one or more anomalies are identified. In some embodiments, the processor is configured to execute the one or more processor-executable routines to identify one or more anomalies if the actual cost and/or usage values is greater than the predicted cost and/or usage values.

The processor 134 is further configured to execute the one or more processor-executable routines to identify one or more related feature sets in the backup/restore system telemetry data based on the identified one or more anomalies. The processor 134 is configured to execute the one or more processor-executable routines to identify related feature sets in the backup/restore system telemetry data based on one or more common attributes in the feature sets corresponding to the storage server data. Non-limiting examples of one or more common attributes include time, cloud service, or cloud region.

Embodiments of the present invention allow for the optimization of the number of forecasting models employed. Since the storage server data and the backup/restore system telemetry data include multiple time series, a separate model is required for each attribute in a feature set. However, filtering the backup/restore system telemetry attributes based on storage server attributes allows for the optimization of the number of models. For example, if there are a regions, b accounts, c services, d API operations, e client, f backup/restore system activities, then the number of models required according to the present invention is $((a*b*c*d)+(a*e*f))$, which allows for optimization of the number of models.

The processor 134 is further configured to correlate one or more clients to the identified one or more anomalies by comparing predicted cost and/or usage values of the one or more related feature sets corresponding to the backup/restore system telemetry data with actual cost and/or usage values of the one or more related feature sets corresponding to the backup/restore system telemetry data.

In some embodiments, the processor 134 is further configured to execute the one or more processor-executable routines to estimate predicted usage values for each feature set of one or feature sets corresponding to the backup/restore system telemetry data. In some embodiments, the processor is configured to execute the one or more processor-executable routines to estimate the predicted cost and/or usage values for each feature set of the one or more feature sets corresponding to the backup/restore system telemetry data based on one or more trained time forecasting models. Non-limiting examples of time-series forecasting models include Fbprophet, ARIMA, SARIMA, exponential smoothing, and the like. The predicted usage values may be stored in the memory 132 in some embodiments, and the processor 134 may be configured to access the predicted cost usage values from the memory 132.

The processor 134 is further configured to execute the one or more processor-executable routines to access the actual cost and/or usage values of the one or more related feature sets corresponding to the backup/restore system telemetry data. In some embodiments, the processor 134 is configured to access the actual cost and/or usage values in real-time. In some other embodiments, the processor 134 is configured to access the actual cost and/or usage values at defined time intervals.

As noted earlier, the processor 134 is further configured to compare the predicted cost and/or usage values of the one or more related feature sets corresponding to the backup/restore system telemetry data with the actual cost and/or usage values of the one or more related feature sets corresponding to the backup/restore system telemetry data. In accordance with embodiments of the present invention, the processor 134 is configured to correlate the anomalies with the one or more clients based on the comparison.

In some embodiments, the processor 134 is further configured to present an output including a list of the one or more anomalies and a list of correlated one or more clients and/or backup/restore system attributes. In some embodiments, the processor 134 is further configured to execute the one or more processor-executable routines to suggest one or more mitigation strategies to the one or more clients correlated to the identified one or more anomalies.

FIG. 2 is a flowchart illustrating a method 200 for performing root-cause analysis of cost and/or usage anomalies in a shared data protection environment including a backup/restore system configured to backup data in a storage server and/or restore data from the storage server. The method 200 may be implemented using the root-cause analysis system 130 of FIG. 1 according to some aspects of the present invention. Each step of the method 200 is described in detail below.

The method 200 includes, at block 202, identifying one or more anomalies by comparing predicted cost and/or usage values of one or more feature sets corresponding to the storage server with actual cost and/or usage values of the same one or more feature sets corresponding to the storage server. The one or more anomalies may be defined at defined time intervals, for example, on an hourly basis, on a daily basis, and the like.

In some embodiments, the method 200 further includes accessing historical data including cost and/or usage data corresponding to the storage server. The historical data may be collected for any time duration suitable for forecasting the storage server data. The method 200 further includes identifying one or more feature sets from the historical data corresponding to the storage server. As noted earlier, the one or more feature sets may include a set of attributes corresponding to the storage server, such as, for example, cloud account id, region, service name, API operation, and the like.

The method 200 further includes estimating predicted cost and/or usage values for each feature set of one or more feature sets corresponding to the storage server. In some embodiments, the method 200 includes estimating the predicted cost and/or usage values for each feature set of one or more feature sets corresponding to the storage server based on one or more trained time-series forecasting models. Non-limiting examples of time-series forecasting models include Fbprophet, ARIMA, SARIMA, exponential smoothing, and the like.

The method 200 further includes accessing the actual cost and/or usage values of the one or more feature sets corresponding to the storage server. In some embodiments, the actual cost and/or usage values are accessed in real-time. In some other embodiments, the actual cost and/or usage values are accessed at defined time intervals. In some embodiments, the method 200 includes accessing the actual cost and/or usage values of each attribute of the one or more feature sets.

In some embodiments, the method 200 includes identifying one or more anomalies if the actual cost and/or usage values vary from the predicted cost and/or usage values based on a defined variance limit. For example, if the difference between the actual cost and/or usage values is within the defined variance limit then no anomalies are identified. However, if the difference between the actual cost and/or usage values is outside the defined variance limit then one or more anomalies are identified. In some embodiments, the method 200 includes identifying one or more anomalies if the actual cost and/or usage values is greater than the predicted cost and/or usage values.

Referring again to FIG. 2, the method 200 further includes, at block 204, identifying related feature sets in a backup/restore system telemetry data based on the identified one or more anomalies. In some embodiments, the method 200 includes identifying related feature sets in the backup/restore system telemetry data based on one or more common attributes in the feature sets corresponding to the storage server data and the feature sets corresponding to the backup/restore system telemetry data. Non-limiting examples of one or more common attributes include time, cloud service, or cloud region.

Embodiments of the present invention allow for the optimization of the number of forecasting models employed. Since the storage server data and the backup/restore system telemetry data include multiple time series, a separate model is required for each attribute in a feature set. However, filtering the backup/restore system telemetry attributes based on storage server attributes allows for the optimization of the number of models. For example, if there are a regions, b accounts, c services, d API operations, e client, f backup/restore system activities, then the number of models required according to the present invention are $((a*b*c*d)+(a*e*f))$, which allows for optimization of the number of models.

At block 206, the method 200 further includes correlating one or more clients to the identified one or more anomalies by comparing predicted cost and/or usage values of the one or more related feature sets corresponding to the backup/restore system telemetry data with actual cost and/or usage values of the one or more related feature sets corresponding to the backup/restore system telemetry data.

In some embodiments, the method 200 further includes estimating predicted usage values for each feature set of the one or feature sets corresponding to the backup/restore system telemetry data. In some embodiments, the method 200 includes estimating the predicted cost and/or usage values for each feature set of the one or more feature sets corresponding to the backup/restore system telemetry data based on one or more trained time forecasting models. Non-limiting examples of time-series forecasting models include Fbprophet, ARIMA, SARIMA, exponential smoothing, and the like.

In some embodiments, the method 200 further includes accessing the actual cost and/or usage values of the one or more related feature sets corresponding to the backup/restore system telemetry data. In some embodiments, actual cost and/or usage values are accessed in real-time. In some other embodiments, the actual cost and/or usage values are accessed at defined time intervals.

As noted earlier, the method 200 further includes, at block 206, comparing the predicted cost and/or usage values of the one or more related feature sets corresponding to the backup/restore system telemetry data with the actual cost and/or usage values of the one or more related feature sets corresponding to the backup/restore system telemetry data. In accordance with embodiments of the present invention, the method 200 includes, at block 206, correlating the anomalies with the one or more clients based on the comparison.

In some embodiments, the method 200 further includes presenting an output including a list of the one or more anomalies and a list of correlated one or more clients and/or backup/restore system attributes. In some embodiments, the method 200 further includes suggesting one or more mitigation strategies to the one or more clients correlated to the identified one or more anomalies.

In some embodiments, the method 200 includes performing root-cause analysis for one or more cost anomaly use cases in the shared data protection environment. In some other embodiments, the method 200 includes performing root-cause analysis for one or more data protection and ransomware detection use cases in the shared data protection environment.

Figure 3:
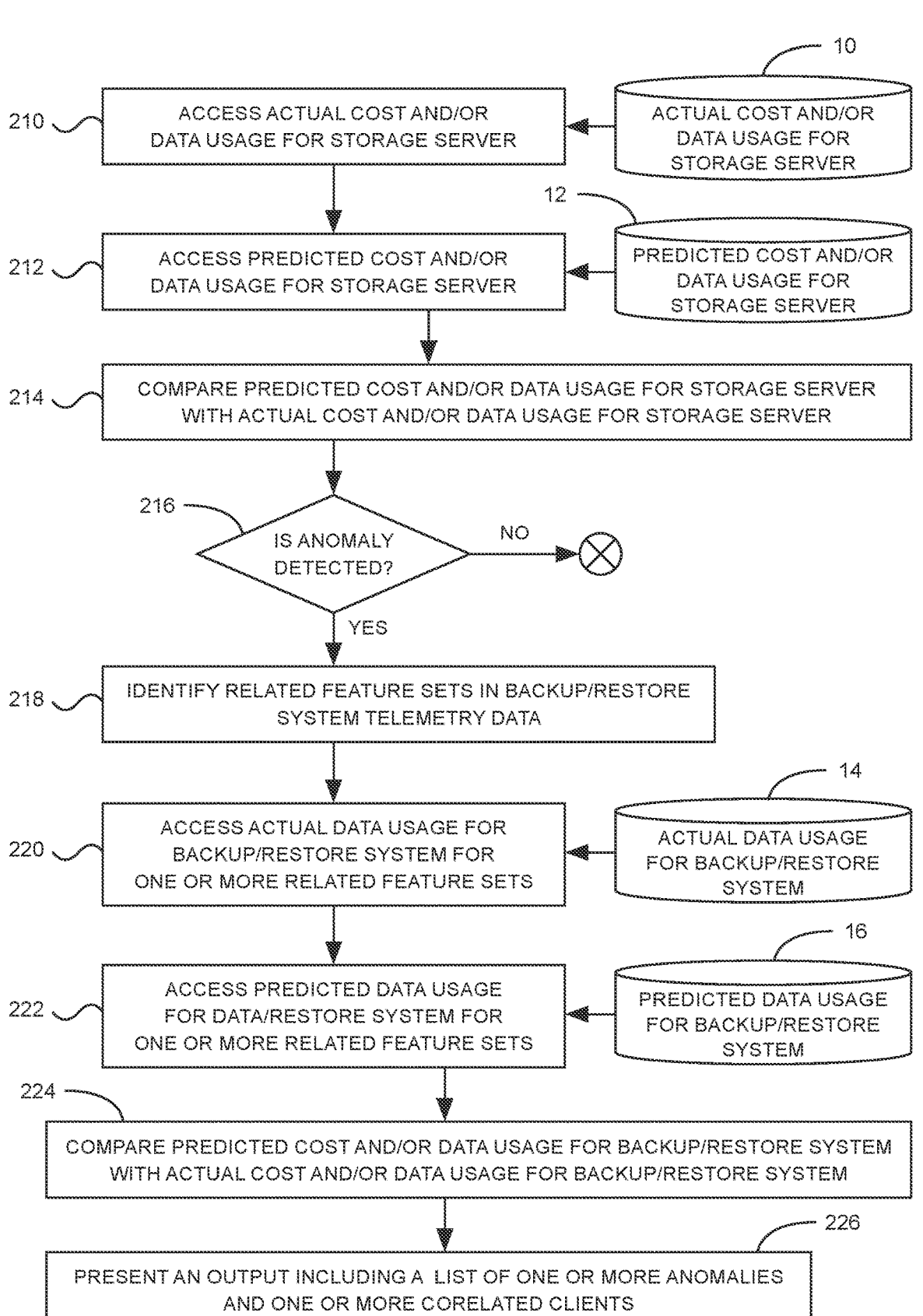
FIG. 3 is a flow chart illustrating a method to perform root-cause analysis of anomalies in a shared data protection environment, according to some aspects of the present description.

FIG. 3 shows an example flow chart for the method 200 for performing root-cause analysis of anomalies in accordance with some embodiments of the present invention. The method 200, includes at block 210, accessing actual cost and/or data usage values 10 of the one or more feature sets corresponding to the storage server. The method 200 further includes, at block 212, accessing predicted cost and/or usage values 12 of the one or more feature sets corresponding to the storage server. The method 200 moreover includes, at block 214, comparing the actual cost and/or usage values with the predicted cost and/or usage values for the storage server. If one or anomalies are detected, at block, 216, the method proceeds to block 218, else the process stops at block 216. At block 218, the method 200 includes identifying related feature sets in backup/restore system telemetry data based on the identified one or more anomalies. At block 220, the method 200 includes accessing actual data usage values 16 of one or more related feature sets corresponding to the backup/restore system. The method 200 further includes, at block 222, accessing predicted cost and/or usage values 16 of the related feature sets corresponding to the backup/restore system. The method 200 moreover includes, at block 224, comparing the actual cost and/or usage values with the predicted cost and/or usage values for the one or more related feature sets corresponding to the backup/restore system. At block 226, the method 200 includes presenting an output including a list of one or more anomalies and one or more correlated clients. In some embodiments, the output may further include a list of correlated one or more backup/restore system attributes.

The method of FIG. 3 is further elucidated herein with an example scenario. Assuming time "T" is when one or more anomalies are to be identified. At this time "T" four different datasets are employed for root-cause analysis:

Dataset A: Actual cloud server cost and usage dataset (e.g., AWS cost and usage dataset). This dataset represents actual values for the tuple ("ts_hr", "aws_account_id", "region", "aws_service", "aws_api_operation", "aws_usage_cost"). For example, the actual values may be ("2022-12-10T09:00:00.000Z", 1234567890, "us-east-1", "S3", "PUTObject", "40")

Dataset B: Predicted AWS cost and usage dataset. This dataset represents the predicted values for the same tuple as dataset A, where aws_usage_cost is the upper limit. In the example illustrated here, predicted values may be calculated weekly and T-90 days of data may be used to train the model which predicts the next 7 days of aws_usage_cost.

Dataset C: Actual backup/restore system telemetry data. This dataset represents actual values for the tuple ("ts_hr", "customer id", "region", "product_service", "aws_service", "aws_api_operation" "aws_service_usage"). For example, the actual values may be ("2022-12-10T09:00:00.000Z", 1234, "us-east-1", "Backup", "S3", "PUTObject", "10000").

Dataset D: predicted backup/restore system telemetry data. This dataset represents the predicted values for the same tuple as dataset C, where aws_service_usage is the upper limit. In the example illustrated here, predicted values may be calculated weekly and T-90 days of data may be used to train the model which predicts the next 7 days of aws_service_usage.

In the example illustrated above, the one or more anomalies may be detected by comparing aws_usage_cost values in dataset A and dataset B. If the aws_usage_cost value in dataset A exceeds the aws_usage_cost value in dataset B, an anomaly is identified. For all the anomalies identified, a first list of ("ts_hr", "aws_account_id", "region", "aws_service", "aws_api_operation", "aws_usage_cost") tuples is generated. One or more related feature sets ("ts_hr", "region", "aws_service", "aws_api_operation") are identified based on the first list. Datasets C and D are further filtered based on the related feature set. Values of aws_service_usage for filtered datasets C and D are further compared. If the aws_service_usage value in dataset C exceeds the aws_service_usage value in dataset D, a filtered list of one or more anomalies is identified. Based on the filtered list of anomalies a second list of tuples ("ts_hr", "customer id", "region", "product_service", "aws_service", "aws_api_operation" "aws_service_usage") is generated. The first list of tuples and the second list of tuples is joined to obtain ("ts_hr", "aws_account_id", "region", "aws_service", "aws_api_operation", "aws_usage_cost", "list_customerid"), thereby correlating the anomalies to customer id.

Thus, the systems and methods in accordance with embodiments of the present invention provide automatic detection of anomalies in the shared data protection environment. Thereby saving manual effort and time required to identify the anomalies and correlate the anomalies with a client. Further, the techniques disclosed herein are non-intrusive as they do not require code-level changes to the backup/restore process.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 4:
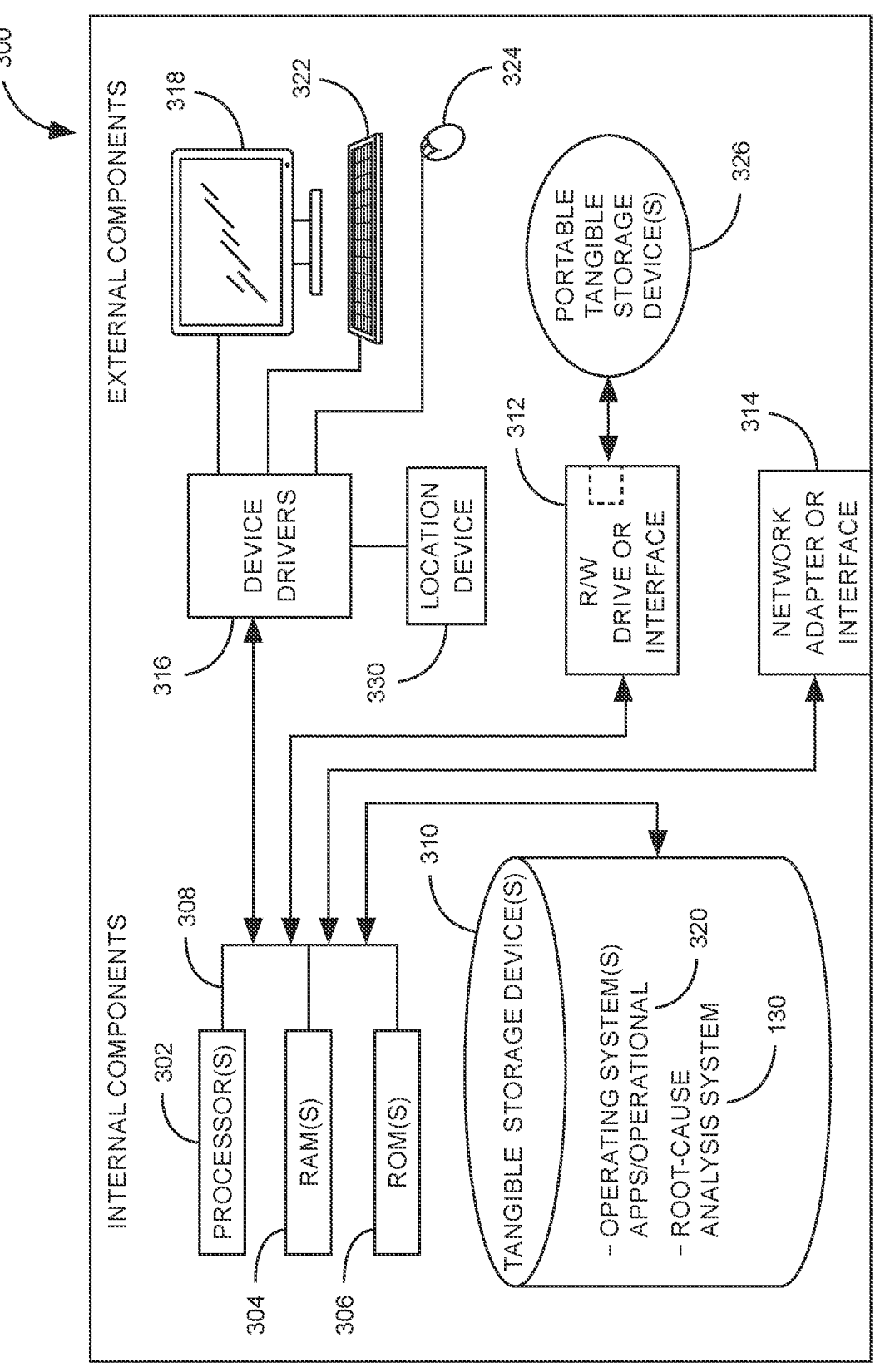
FIG. 4 is a block diagram illustrating an example computer system, according to some aspects of the present description.

One example of a computing system 300 is described below in FIG. 4. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the root-cause analysis system 130. Both, the operating system 320 and root-cause analysis system 130 are executed by processor 302 via one or more respective RAMs 304 (which typically includes cache memory). The execution of the operating system 320 and/or the root-cause analysis system by the processor 302, configures the processor 302 as a special-purpose processor configured to carry out the functionalities of the operating system 320 and/or the root-cause analysis system, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the root-cause analysis system 130 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

What is claimed is:

1. A system for performing root-cause analysis of cost and/or usage anomalies in a shared data protection environment comprising a backup/restore system configured to backup data in a storage server and/or restore data from the storage server, the system comprising:
   a memory configured to store one or more processor-executable routines; and
   a processor communicatively coupled to the memory, the processor configured to execute the one or more processor-executable routines to:
   identify one or more anomalies by comparing predicted cost and/or usage values that are estimated using one or more trained time-series forecasting models of one or more feature sets corresponding to the storage server with actual cost and/or usage values of the same one or more feature sets corresponding to the storage server;
   identify one or more related feature sets based on one or more common attributes with the identified anomalies in a backup/restore system telemetry; and
   correlate one or more clients and optimize the number of forecasting models required based on a formula that filters telemetry attributes using storage server attributes to the identified one or more anomalies by comparing predicted cost and/or usage values of one or more of the related feature sets corresponding to the backup/restore system telemetry data with actual cost and/or usage values of the one or more related feature sets corresponding to the backup/restore system telemetry data.

2. The system of claim 1, wherein the processor is further configured to execute the one or more processor-executable routines to suggest one or more mitigation strategies to the one or more clients correlated to the identified one or more anomalies.

3. The system of claim 1, wherein the processor is further configured to execute the one or more processor-executable routines to:
   access historical data comprising cost and/or usage data corresponding to the storage server;
   identify one or more feature sets from the historical data corresponding to the storage server; and estimate predicted cost and/or usage values for each feature set of the one or more feature sets corresponding to the storage server.

4. The system of claim 3, wherein the processor is configured to execute the one or more processor-executable routines to estimate the predicted cost and/or usage values for each feature set of one or more feature sets corresponding to the storage server based on one or more trained time forecasting models.

5. The system of claim 1, wherein the processor is further configured to execute the one or more processor-executable routines to estimate predicted cost and/or usage values for each feature set of the one or more related feature sets corresponding to the backup/restore system telemetry data.

6. The system of claim 5, wherein the processor is configured to execute the one or more processor-executable routines to estimate the predicted cost and/or usage values for each feature set of the one or more feature sets corresponding to the backup/restore system telemetry data based on one or more trained time forecasting models.

7. The system of claim 1, wherein the one or more common attributes comprise time, cloud service, or cloud region.

8. The system of claim 1, wherein the system is configured to perform root-cause analysis for one or more cost anomaly use cases in the shared data protection environment.

9. The system of claim 1, wherein the system is configured to perform root-cause analysis for one or more data protection and ransomware detection use cases in the shared data protection environment.

10. A method for performing root-cause analysis of cost and/or usage anomalies in a shared data protection environment comprising a backup/restore system configured to backup data in a storage server and/or restore data from the storage server, the method comprising:

identifying one or more anomalies by comparing predicted cost and/or usage values that are estimated using one or more trained time-series forecasting models of one or more feature sets corresponding to the storage server with actual cost and/or usage values of the one or more feature sets corresponding to the storage server;

identifying related feature sets based on one or more common attributes with the identified anomalies in a backup/restore system telemetry data; and correlating one or more clients and optimizing the number of forecasting models required based on a formula that filters telemetry attributes using storage server attributes to the identified one or more anomalies by comparing predicted cost and/or usage values of one or more of the related feature sets corresponding to the backup/restore system telemetry data with actual cost and/or usage values of the one or more related feature sets corresponding to the backup/restore system telemetry data.

11. The method of claim 10, wherein the method further comprises suggesting one or more mitigation strategies to the one or more clients correlated to the identified one or more anomalies.

12. The method of claim 10, wherein the method further comprises:

accessing historical data comprising cost and/or usage data corresponding to the storage server;

identifying one or more feature sets from the historical data corresponding to the data storage; and estimating predicted cost and/or usage values for each feature set of the one or more feature sets corresponding to the storage server.

13. The method of claim 12, wherein the method comprises estimating the predicted cost and/or usage values for each feature set of one or more feature sets corresponding to the storage server based on one or more trained time forecasting models.

14. The method of claim 10, wherein the method further comprises estimating the predicted cost and/or usage values for each feature set of the one or more related feature sets corresponding to the backup/restore system telemetry data.

15. The method of claim 14, wherein the method comprises estimating the predicted cost and/or usage values for each feature set of the one or more feature sets corresponding to the backup/restore system telemetry data based on one or more trained time forecasting models.

16. The method of claim 10, wherein the one or more common attributes comprise time, cloud service, or cloud region.

17. The method of claim 10, wherein the method comprises performing root-cause analysis for one or more cost anomaly use cases in the shared data protection environment.

18. The method of claim 10, wherein the method comprises performing root-cause analysis for one or more data protection and ransomware detection use cases in the shared data protection environment.

* * * * *